INVENTORS.
MATTHEW J. RELIS
DAVID H. MARCUS
BY Eli Weiss
ATTORNEY

Nov. 29, 1960 M. J. RELIS ET AL 2,962,705

ANALOG-DIGITAL CONVERTER

Filed Dec. 31, 1956 3 Sheets-Sheet 2

INVENTORS.
MATTHEW J. RELIS
DAVID H. MARCUS
BY Eli Weiss
ATTORNEY

INVENTORS.
MATTHEW J. RELIS
DAVID H. MARCUS
BY Eli Weiss
ATTORNEY

United States Patent Office 2,962,705

Patented Nov. 29, 1960

2,962,705

ANALOG-DIGITAL CONVERTER

Matthew J. Relis, Bayside, and David H. Marcus, Syosset, N.Y., assignors to Control Instrument Company, Brooklyn, N.Y., a corporation of New York Filed Dec. 31, 1956, Ser. No. 632,621

7 Claims. (Cl. 340—347)

This invention relates in general to coding devices and more particularly to the encoding of analog information into binary coded values.

Generally, analog devices have many disadvantages among which are lack of precision, high initial cost, low life, relatively narrow range of operation, high noise level, and poor reliability due to wear of mechanical parts.

Frequently, analog information which appears in the form of a voltage, or an angular, or linear displacement is generally converted into digital form before being recorded or utilized in the solution of problems.

Presently, one method of converting information from analog to digital form is to utilize a non-conductive code wheel containing an involved pattern of connecting conductive areas in the form of the binary code. The code wheel is rotated through an angular displacement proportional to the magnitude of the analog value. The conductive areas are scanned by a plurality of contacts formed by a plurality of brushes positioned within close proximity to each other, and extending along a radius of the disc. A single brush energizes each of the conductive areas on the wheel. As the code wheel rotates the plurality of brushes that contact conductive areas are energized while those brushes that do not contact conductive areas remain de-energized. The particular pattern of energized and de-energized brushes indicates the position of the code wheel and, therefore, the digital equivalent of the analog value. Thus, a separate brush is required for each bit sensed. The code wheel is divided into many discrete zones wherein each zone has its own distinctive pattern of conductive and non-conductive areas to form a distinctive pattern of energized brushes. Aside from the fact that this type of converter is expensive to produce, limited in accuracy, susceptible to errors due to mechanical wear, difficult to maintain, and relatively short lived, it is large in size and has a relatively high value of inertia.

Accordingly it is an object of this invention to provide an improved high precision device that converts information from analog form into digital form.

A further object of the invention is to provide an analog-digital converter that does not require a code wheel containing conductive segments arranged in a pattern dictated by the binary code.

An additional object of the invention is to provide an analog-digital converter that has a high degree of accuracy.

Another object of the invention is to provide an analog-digital converter that has relatively low inertia.

Still another object of the invention is to provide an analog-digital converter that is compact in size, reliable in operation, and economical to produce.

Still another object of the invention is to provide an analog-digital converter that is free of errors due to mechanical wear and free of ambiguities in reading a displacement.

Other objects and many of the attendant advantages of this invention will be readily appreciated as the same becomes better understood by reference to the following detailed description when considered in connection with the accompanying drawings wherein.

This analog to digital converter is of the brush and commutator type incorporating a stationary disc having one hundred electrically insulated commutator segments cooperating with three pairs of rotatable brushes geared to an input shaft and positioned to revolve about the center axis of the disc. The three brush sets are geared to rotate respectively at "one" speed, "one hundred" speed, and "ten thousand" speed. Thus, for each complete revolution of the "ten thousand" speed brush set, the "one hundred" speed brush set advances one complete segment; and for each complete revolution of the "one hundred" speed brush set, the "one" speed brush set advances one complete segment.

The angular position of the three pairs of brushes relative to the disc is a direct measure of the position of the input shaft, and is determined by first sequentially energizing a particular brush in each pair of brushes and then detecting and indicating the commutator segments or members energized. Energizing the "ten thousand" speed brush generates the two lowest order decimal digits; energizing the "one hundred" speed brush generates the hundreds and thousands digits; and energizing the "one" speed generates the ten thousands and hundred thousands digits.

Energizing a particular brush of each of the three brush sets sequentially instead of simultaneously permits the use of one disc with commutator segments common to all brushes instead of a separate disc for each brush, and reduces by approximately two thirds the amount of equipment required at the output of the discs when more than one disc is utilized.

Since the output signals of the disc are essentially decimal in form, a matrix of diodes is utilized to convert the output information to binary-coded decimal form.

Ambiguities, such as those caused by a brush straddling two adjacent commutator segments or by a brush making contact with the insulated area between segments only, and the usual disadvantages of backlash in the various gear trains, are avoided by utilizing a split or pair of brushes consisting of two isolated sections wherein the output of the previously sampled brush determines which section of the next speed brush is to be pulsed.

The system of using one coordinate brush as the reference for its next lower speed brush results in a device that permits high backlash tolerances with practically no ambiguities.

Figure 1:
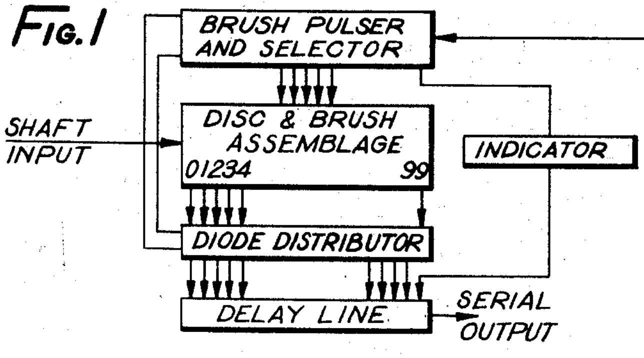
Fig. 1 is a block diagram of the overall system.

Referring to Fig. 1, therein is illustrated in block form the overall system showing the interconnections between the master clock unit, the brush pulser and selector, the disc and brush assemblage, the diode distributor, and the delay line. The master clock determines the timing of the system by feeding a signal having a constant repetition rate to the brush pulser and selector, and to the memory device. The brush pulser and selector feeds sequentially a signal to one brush of each of the three pairs of brushes.

The disc and brush assemblage comprises a disc or other member of insulative material that supports a plurality of electrically isolated conductive wedge shaped members that extend from the center of the disc to its circumference. Each of the three pairs of brushes is rotated at a predetermined speed relative to the input shaft.

The relationship between the number of conductive segments, or members, supported by the disc and the relative speeds of rotation of each of the brushes is predetermined in accordance with the requirements of the associated equipment. For the purpose of explanation only, the insulating disc is shown as supporting one hundred electrically disjoined conductive segments that are scanned by and make contact with three pairs of brushes driven to rotate at "ten thousand" speed, "one hundred" speed, and "one" speed relative to the input shaft. Each of the three pairs of brushes rotate in the same direction. The above mentioned values result in a device that generates very accurate results.

The position of the brushes represent information in analog form. This information is converted to binary-coded decimal form by means of a diode distributor that converts a signal from a particular conducting segment into a particular output signal. Each conducting segment is associated with a discrete pattern of output signals. Thus, each instant that a brush is energized, a specific commutator segment is energized and a discrete pattern of output signals is formed.

The diode distributor generates two binary coded decimal digits that appear simultaneously at the output terminals. To transform the parallel signals into serial signals, a delay circuit can be used.

The master clock comprises a pulse generator that generates constant amplitude pulse signals at predetermined time intervals. Each signal represents a sampling pulse, and the time spacing between adjacent signals represents the duration between sampling signals. Each generated signal from the master clock unit is fed into a series of delay lines. The input terminal of the first delay line is coupled to feed a signal to the "ten thousand" speed brush, the input terminal of the second delay line is coupled to feed a signal to the "one hundred" speed brush, and the output terminal of the second delay line is coupled to feed a signal to the "one" speed brush. The total delay experienced by the pulse signal in traveling through each delay line can be any value greater than the time required to allow a previously passed signal to clear the diode distributor. The timing however, depends upon the manner in which the output is used, thus, where full serial output is desired the delay must be long enough to allow the most signficant figure to pass through. A delay line having a time delay of eight-tenths of the duration of the clock pulse will perform in a satisfactory manner, however, this value may be varied to fit individual requirements. Thus, eight-tenths of a pulse time after the sampling pulse is fed to the "ten thousand" speed brush, it is fed to the "one hundred" speed brush; and eight-tenths of a pulse time after the sampling pulse is fed to the "one hundred" speed brush it is fed to the "one" speed brush. In this manner there is a minimum time delay in the sequential pulsing of the "ten thousand" speed brush, the "one hundred" speed brush, and the "one" speed brush.

Figure 2:
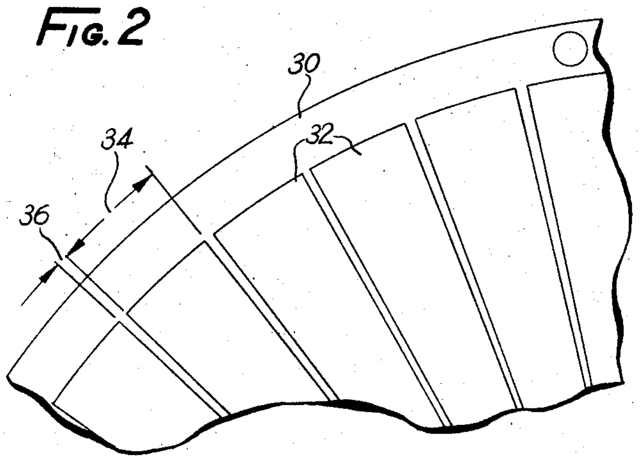
Fig. 2 is a greatly enlarged plan view of a portion of the disc showing the conductive segments.

Referring to Fig. 2, there is shown a greatly enlarged section of a plan view of an insulating disc 30 supporting a plurality of electrically isolated conducting commutator segments or members 32. The disc 30 is composed of insulating material such as glass, fibre, plastic, or the like. The commutator segments 32 are composed of a material possessing good electrical conducting properties such as copper, aluminum or the like. A disc 30 having one hundred segments or members 32 wherein the width 34 of each segment is ten times the width 36 of the spacing between adjacent segments will perform in a satisfactory manner. It is to be understood, however, that the number of commutator segments 32 that are supported by the disc 30 and the relationship of the width of each segment to the width of the spacing between adjacent segments can be decreased or increased in accordance with the design requirements imposed by particular problems. For purposes of illustrations, it shall be assumed that the disc supports one hundred commutator segments 32 that are electrically isolated from each other.

Figure 3:
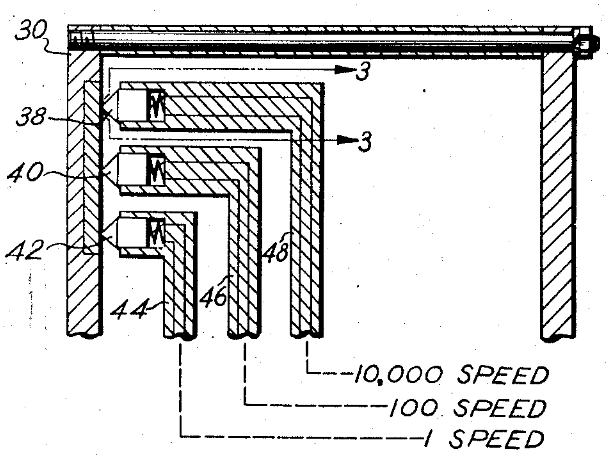
Fig. 3 is a cross sectional view of the disc and brush assemblage showing the brushes aligned and contacting a single conductive segment.

Referring to Fig. 3, there is disclosed a partial cross sectional view of the disc and brush assemblage. The disc is mounted in space relationship to three pairs of rotatable split brushes 38A and 38B, 40A and 40B, and 42A and 42B. The brushes bear against and scan the disc 30 and the conductive commutator members 32. Each brush 38A, 38B, 40A, 40B, 42A and 42B is shaped to present a small area contact surface to the disc 30 and the commutator members 32. Each pair of brushes consists of two identical brushes electrically isolated from each other and displaced from each other such that one of the brushes follows the trace of the other brush. The rotational speed of each pair of brushes is fixed relative to each of the other pairs of brushes such that a particular pair of brushes 38 rotates at the "ten thousand" speed, another pair of brushes 40 rotates at the "one hundred" speed, and still another pair of brushes 42 rotates at the "one" speed. Thus, by means of gears or the like each of the three pairs of brushes rotate through an angular displacement that is proportional to the angular displacement of the other two pairs of brushes. The set of high speed brushes 38 is driven through the member 48 by the device whose angular displacement is being measured. The "ten thousand" speed brush drives the other pairs of brushes 40 and 42 which in turn are coupled to the members 46 and 44 respectively through gears having the appropriate speeds. Thus, the pair of brushes 42 rotates at the same or "one" times the speed of the driving means; the pair of brushes 40 rotates "one hundred" times the speed of the driving means; and the pair of brushes 38 rotates "ten thousand" times the speed of the driving means.

Figure 4:
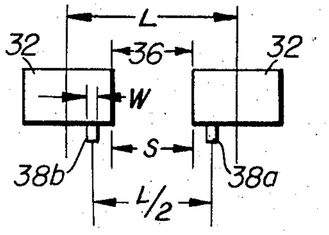
Fig. 4 illustrates the spacing of the conductive segments relative to the spacing between the brushes of a pair of brushes.
Figure 5:
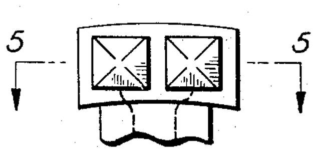
Fig. 5 is an end view of a brush assemblage looking in the direction of the line 3—3 of Fig. 3.
Figure 6:
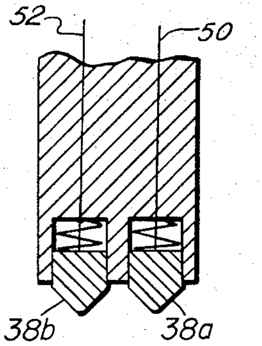
Fig. 6 is a cross-sectional view of the brush assemblage of Fig. 5 looking in the direction of the line 5—5.

Fig. 4 illustrates the space relationship between a pair of brushes and the commutator segments and defines this relationship as follows:

$$W<S \text{ and } L>2S$$

where $W$—width of contact area of a brush $S$—distance between commutator segments $L$—distance between center lines of adjacent commutator segments Fig. 5 is an end view looking along the lines 3—3 of Fig. 3 showing the front of the pair of brushes 38 and the brush supporting member of arm 48. Fig. 6 shows a cross sectional view of the brush assemblage of Fig. 5 looking in the direction of the line 5—5. The supporting members or arms 44, 46 and 48 of the pairs of brushes are composed of insulating material that electrically isolates adjacent brushes from each other. Utilization of separate electrical conductors allows an electrical signal to be transmitted to either brush of each pair of brushes independently of the other brush. Thus, referring to Fig. 6, the conductor 50 or 52 is utilized to feed signals to the brush 38A or 38B respectively. The arms of the brushes are rotated by means of concentric shafts and signals are fed to the brushes by means of slip rings.

When utilizing a disc that supports one hundred commutator segments and brushes that are rotated at "ten thousand" speed, "one hundred" speed, and "one" speed, the following relationships are present: The "one hundred" speed brush rotates through an angle subtended by one-half of one segment for each one-half of a revolution of the "ten thousand" speed brush; and the "one" speed brush rotates through an angle subtended by one-half of one segment for each one-half of a revolution of the "one hundred" speed brush.

Figure 7:
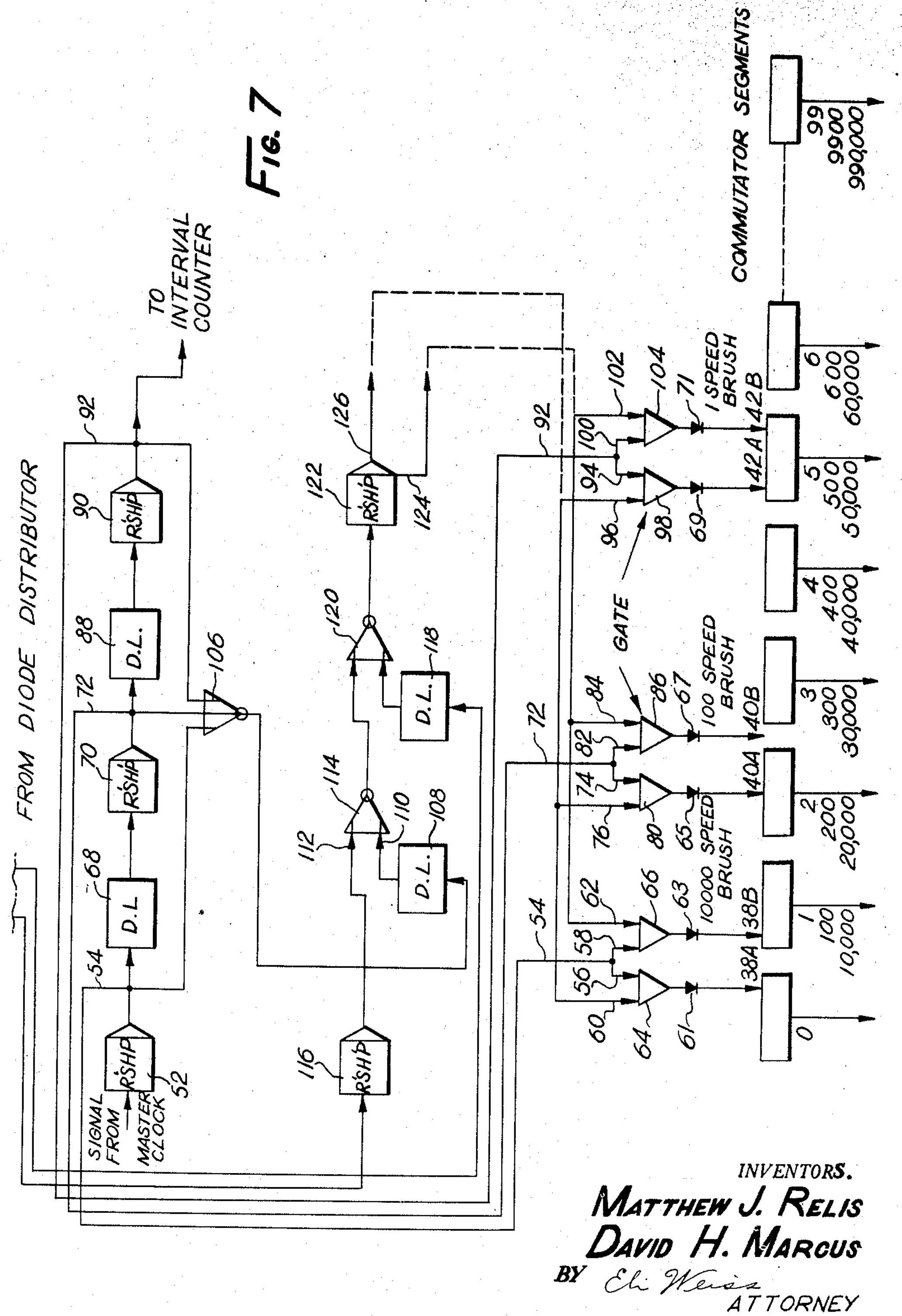
Fig. 7 illustrates in block form the brush pulser and selector and its connections to brushes and commutator segments on the disc.

Fig. 7 illustrates in block form the brush pulser and selector electrically coupled to the commutator segments through the three pairs of rotatable brushes 38A and 38B, 40A and 40B, and 42A and 42B. The sampling sequence consists of pulsing the "ten thousand" speed brush first, the "one hundred" speed brush second, and the "one" speed brush third. The timing sequence is controlled by two series coupled delay lines wherein the "ten thousand" speed brush is coupled to receive the signal as it is fed to the input terminal of the first delay line; the "one hundred" speed brush is coupled to the output terminal of the first delay line to receive the signal after it has been delayed, and the "one" speed brush is coupled to the output terminal of the second delay line to receive the initial signal after it has been again delayed by the second delay line. The delay lines are equal in value and present a time delay that is of sufficient duration to allow the signals on each brush to be stepped through their associated segments prior to the arrival of the next signal.

Each brush, when energized generates two binary-coded decimal digits to indicate the particular commutator segment energized. Each binary-coded decimal digit is composed of four bits of information; therefore, each brush generates eight bits of information arranged in two groups of four bits each at each instant that it is pulsed. Thus, the number sixty-two, when represented with two binary coded decimal digits, would be composed of a first group of four digits arranged to represent the number sixty, and another group of four digits arranged to represent the number two. Each one of the commutator segments zero through ninety-nine is represented in this manner.

By energizing the pairs of brushes sequentially instead of simultaneously, the requirement of separate commutator segments for each pair of brushes is eliminated and the high, medium, and low speed brushes can utilize common commutator segments.

A signal in the form of an electrical pulse is generated by the master clock unit and fed to a reshaper 52 where its wave shape is improved. The output signal from the reshaper 52 is fed through the conductor 54 to input terminals 56 and 58 of the gates 64 and 66 respectively and through a delay line 68 to a reshaper 70. The output signal from the reshaper 70 is fed through the conductor 72 to the input terminals 74 and 82 of the gates 80 and 86 respectively and is also fed through a delay line 88 to a reshaper 90. The output signal from the reshaper 90 is fed through the conductor 92 to the input terminals 94 and 100 of the gates 98 and 104 respectively.

A three input terminal buffer 106 feeds the signals from the conductors 54, 72 and 92 through a delay line 108 to an input terminal 110 of a gate 114. An input terminal 112 of the gate 114 receives the output signals from a reshaper 116.

The output terminals of the gate 114 and of a delay line 118 feed input signals through a buffer 120 to a reshaper 122 having two output terminals 124 and 126. The output terminal 124 feeds signals to the input terminals 62, 84, and 102 of the gates 66, 86 and 104 respectively; and the output terminal 126 feeds signals to the input terminals 60, 76 and 96 of the gates 64, 80 and 98 respectively.

The pair of "ten thousand" speed brushes 38A and 38B are fed by the gates 64 and 66 respectively; the pair of "one hundred" speed brushes 40A and 40B are fed by the gates 80 and 86 respectively; and the pair of "one" speed brushes 42A and 42B are fed by the gates 98 and 104 respectively.

Rectifiers 61, 63, 65, 67, 69 and 71 that can be of the crystal diode type or the like are coupled in series with each brush 38A, 38B, 40A, 40B, 42A and 42B respectively to prevent the formation of spurious signals by undesirable current return paths.

The insulating disc supporting the conductive commutator segments is fixed in position and is in contact with the three sets of brushes 38A and 38B, 40A and 40B, 42A and 42B. The brushes are connected together through gears or the like to rotate at a fixed speed relative to each other, and positioned to indicate a true zero reading when the first brush 38A, 40A and 42A of each pair of brushes is contacting simultaneously the segment designated ninety-nine, and the other brush 38B, 40B and 42B of each pair of brushes is contacting simultaneously the segment designated zero.

One face of the insulating disc supports one hundred wedge shaped conductive commutator segments that extend outwardly from the center of the disc to its circumference. One of the commutator segments or members is arbitrarily assigned the number zero and is thereafter utilized as the base or reference segment. Proceeding around the disc in a clockwise direction each next appearing conductive segment or member is assigned the next higher number until each segment has been numbered. Thus, the segments are numbered from zero through ninety-nine and divide one face of the disc into one hundred equal parts that can be sensed electrically to indicate a displacement of the brushes relative to the disc. To convert the displacement of the brushes relative to the disc from analog to digital form, a diode distributor having one hundred input terminals is electrically coupled to each of the conductive commutator segments by means of solder or the like.

Figure 8:
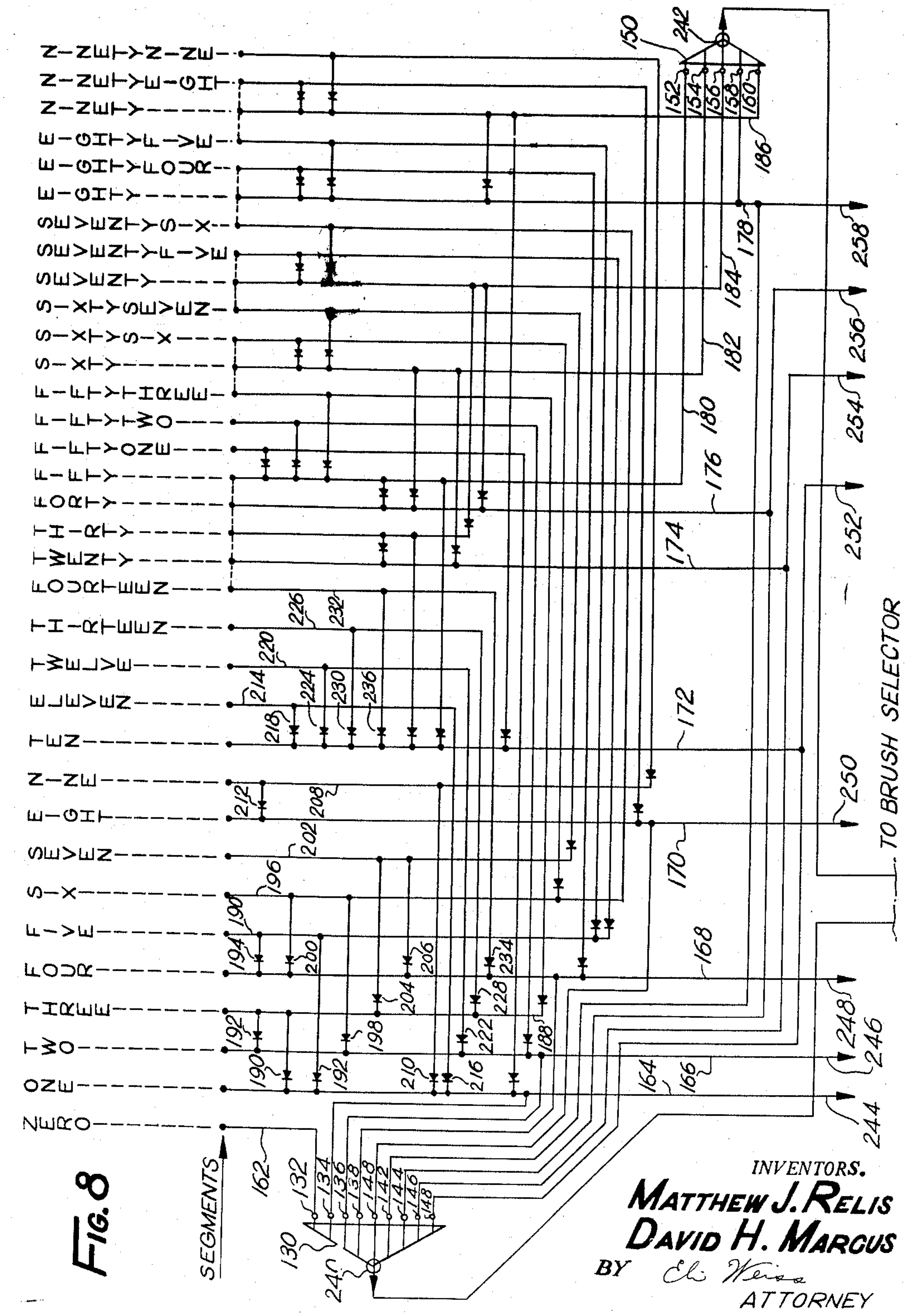
Fig. 8 is a schematic wiring diagram of the diode distributor and two buffers that feed information from the diode distributor to the brush pulser and selector to select a particular brush of a set of brushes.

Referring to Fig. 8, the diode distributor incorporates a buffer 130 having nine input terminals 132, 134, 136, 138, 140, 142, 144, 146, and 148; a buffer 150 having five input terminals 152, 154, 156, 158 and 160, and a plurality of associated crystal diodes.

The commutator segments designated zero, one, two, four, eight, ten, twenty, forty and eighty feed signals to the input terminals of the buffer 130 through the conductors, 162, 164, 166, 168, 170, 172, 174, 176 and 178 respectively. The commutator segments designated fifty, sixty, seventy, eighty, and ninety, are coupled to feed the input terminals of the buffer 150 through the conductors 180, 182, 184, 178 and 186 respectively. Commutator segment eighty is coupled to the input terminals of the buffers 130 and 150; commutator segment three is coupled to the conductors 164 and 166 through the conductor 188 and the crystal diodes 190 and 192; and commutator segment five is coupled to the conductors 164 and 168 through the conductor 190 and the rectifiers 192 and 194.

Commutator segment designated six is coupled to the conductors 166 and 168 through the conductor 196, and the rectifiers 198 and 200; commutator segment seven is coupled to the conductors 188 and 168 through the rectifiers 204 and 206, and the conductor 202; commutator segment nine is coupled to the conductors 164 and 170 through the rectifiers 210 and 212, and the conductor 208; commutator segment eleven is coupled to the conductors 164 and 172 through the rectifiers 216 and 218 and the conductor 214; commutator segment twelve is coupled to the conductors 166 and 172 through the rectifiers 222 and 224, and the conductor 220; commutator segment thirteen is coupled to the conductors 188 and 172 through the rectifiers 228 and 230, and the conductor 226; and commutator segment fourteen is coupled to the conductor 168 and 172 through the rectifiers 234 and 236, and the conductor 232.

Thus, it becomes obvious that for the conductive members of segments designated zero through nineteen the basic conditions that exist are as follows: Segments zero, one, two, four, eight, and ten are primary members. The term primary member indicates a commutator member or segment that transmits information representative of a particular value along a single conductor to a single output terminal. The remaining or secondary members are identified by the combination of two or more basic elements. For example, segment three transmits information to a combination of members or segments one and two. The commutator segment designated five is connected to transmit signals to a combination of the segments designated one and four; and the segment designated nine is connected to transmit signals to a combination of the segments designated one and eight. Thus, the segment designated three feeds signals to the segments designated one and two; the segment designated five feeds signals to the segments designated one and four; and the segment designated six feeds signals to the segments designated two and four. Continuing with the procedure of building successive numbers by combining previously formed numbers, the segment designated elevent is identified by feeding received signals to the segments designated ten and one; the segment designated twelve is identified by feeding received signals to the segments designated ten and two; the segment designated thirteen is identified by feeding received signals to the segments designated ten and three; the segment designated fourteen is identified by feeding received signals to the segments designated ten and four; and, continuing in a like manner the conductive member designated nineteen is identified by feeding received signals to the segments designated ten and nine.

By wiring the diode distributor in an orderly manner starting from the segment zero and proceeding to the next apeparing higher order segment, then the conductor leading from segment thirteen to segment three actually couples the segment thriteen to the segments two and one.

Thus, while it apears from Fig. 8 that commutator segment thirteen is coupled of the segments three and ten, the commutator segments designated thirteen is actually coupled to the primary segments designated one, two, and ten.

The commutator members or segments twenty, forty and eighty are also primary commutator segments. Therefore, the commutator segment designated twenty-one is coupled to the segments designated one and twenty; segment thirty is coupled to the segments designated ten and twenty; segment fifty is coupled to the combination of segments designated one and forty; segment fifty-three is coupled to the combination of segments designated three and fifty; segment sixty is coupled to the combination of segments designated twenty and forty; segment sixty-seven is coupled to the combination of segments designated seven and sixty; segment seventy is coupled to the combination of segments designated thirty and forty; segment seventy-five is coupled to the combination of segments designated five and seventy; segment eighty-four is coupled to the combination of segments designated four and eighty; segment ninety is coupled to the combination of segments designated ten and eighty; and segment ninety-nine is coupled to the combination of segments designated nine and ninety.

To simplify the drawings and to facilitate the explanation of this invention a number of conductive segments have not been shown on the disc or in the diode distributor. However, for purposes of explanation it is to be understood that the disc supports one hundred segments which are numbered from zero to ninety-nine. The connections of the intermediate commutator segments that are not illustrated are obvious when the orderly wiring procedure shown and previously described is followed.

Referring to Figs. 7 and 8, the output terminal 240 of the buffer 130 is coupled to the input terminal of the reshaper 116; and the output terminal 242 of the buffer 150 is coupled to the input terminal of the delay line 118.

Returning to Fig. 8, the binary coded units, hundreds, and ten thousands digits appear at the output terminals 244, 246, 248 and 250, respectively; and the binary coded tens, thousands, and hundred thousands digits appear at the output terminals 252, 254, 256 and 258 respectively.

The signals that appear at the output terminals of the diode distributor represents the commutator segments scanned by the sets of brushes. The signal generated by each brush appears in parallel form, however, the brushes are alternately energized; therefore the output signals of the diode distributor are sequentially appearing groups of parallel signals. Each group of parallel appearing output information is converted to serial information by feeding the parallel appearing binary coded decimal output signals into input terminals of a delay line. The delay line presents varying degrees of delay to the parallel information such that the least significant figure is subjected to the least delay and the most significant figure is subjected to the most delay. Since each group of signals appears sequentially, full serial form can be obtained by maintaining a uniform increasing time delay between the output terminal and each successive input terminal of the delay line; and by energizing the next succeeding brush immediately after the last bit or signal appears at the output terminal of the delay line.

Since the high, medium, and low speed brushes are pulsed sequentially, only one diode distributor is required. However, since the output information from the diode distributor represents the position of the energized high, medium, or low speed brush, an indicator device is required to indicate the start of each set of readings. Referring to Fig. 1, the indicator device generates a discrete signal at a predetermined instant relative to the output of the diode distributor to index each reading or each group of readings.

The number of brushes, the speeds of rotation of the brushes relative to each other and the number of commutator segments on the insulating disc were chosen for ease of explanation only and either one or all of the above can be increased or decreased to fit particular requirements. If additional discs and brushes are required, the newly added discs can be coupled to feed the originally utilized diode distributor, and all the brushes reconnected to be pulsed sequentially. Thus, the utilization of three discs requires only one diode distributor that is pulsed sequentially by all the brushes.

In the operation of this device, the brushes are driven by a device whose angular deviation or instantaneous position is required. The angular displacement of the driving member imparts relative proportional angular displacements to the three sets of brushes. The low or "one" speed brush revolves at the same speed as the driving means; the medium or "one hundred" speed brush revolves at a speed one hundred times as fast as the low speed brush; and the high or "ten thousand" speed brush rotates at a speed ten thousand times as fast as the low speed brush.

At a predetermined instant when the sensing of the position of the driving member is desired, the three sets of brushes are sequentially energized. The high or "ten thousand" speed brush representing the least significant pair of decimal digits is energized first. The generated pulse initiated by the master clock is first fed to brush 38B from the reshaper 52 through the conductor 54 and the gate 66. At the same instant, the signal from the reshaper 52 is also fed through the buffer 106 and the delay line 108 to the input terminal 110 of the gate 114. Referring more specifically to the gate 114, if a positive potential pulse signal is present at the input terminal 110 and a positive potential pulse signal is present at the input terminal 112 then a positive potential pulse signal will appear at the output terminal of the gate 114. Under all other signal input conditions to the gate 114 a pulse signal will not be present at the output terminal of the gate 114. The negative going pulse signal appears at the output terminal of the reshaper when a positive going signal is fed to its input terminal, thus, there is a positive potential present at the output terminal of the reshaper when a signal is not present at the input terminal; and the output signal is zero or less when an input signal is present.

Therefore, if the brush 38B is energized when it is in contact with a conductive commutator segment, the pulse will pass through the diode distributor to the buffer 130, and through the reshaper 116 to inhibit the passage of a signal by the gate 114. If, however, the brush 38B is positioned between two adjacent segments when it is energized and, as such, does not make contact with either commutator segment, then a signal will not be transmitted through the diode distributor nor through the buffer 130, and a signal will not be present at the output terminal of the reshaper 116. Thus, if the brush 38B is not contacting a commutator segment at the instant it is energized, then a signal will not be present at the input terminal 112 of the gate 114, and the signal that is present on the terminal 110 will be passed through the gate 114 and through the buffer 120 to the input terminal of the reshaper or one shot multivibrator 122. Referring to the reshaper 122, the absence of a signal at the input terminal generates a positive potential signal at the output terminal 124, and the absence or a zero potential signal at the output terminal 126. When a signal is present at the input terminal of the reshaper 122 a positive potential signal is present at the output terminal 126, and there is a zero potential on the output terminal 124.

Thus, the presence of a signal at the input terminal of the reshaper 122 steps the positive potential output signal from one output terminal to the other to open gate 64 and close gate 66. At the instant of switching, the signal from the output terminal of the reshaper 52 is passed through the gate 64 and through a conductive commutator segment to energize discrete output terminals of the diode distributor. The time duration of the pulse signal appearing at the output terminal of the reshaper 52 is longer than the time required to indicate and actually perform the activation and de-activation of the gates 64 and 66 respectively. This pulse is, however, of sufficient length to generate a significant pulse on the brush 38A or 38B. Gate 66 is blocked by the output of the reshaper 122 thus preventing two adjacent commutator segments from being pulsed simultaneously as brush 38B can make contact with a commutator segment after a signal is applied to brush 38A but before it terminates.

The sampling operation is always initiated by first feeding a signal to the brush 38B. The presence of a signal on any one of the commutator segments will produce a signal at the output terminal of the buffer 130 which effectively inhibits the passage of signals through the gate 114 to maintain brush 38A in a de-activated condition.

If, however, a signal is not present at the output terminal 240 of the buffer 130, then a commutator segment had not been energized through a brush and the gate 114 passes a signal to activate brush 38A and deactivate brush 38B. Thus, each time that a signal is fed to the high speed brush a single commutator segment will be energized by either one of the two brushes 38A or 38B as one of the two brush sections is always in contact with a commutator segment.

The medium or "one hundred" speed brush revolves through one-half the angle subtended by two consecutive segments for each half revolution of the high speed brush. This fact is utilized to determine which section of the medium speed brush is pulsed. If the high speed brush energizes one of the commutator segments designated zero through forty nine, then brush 40B is energized; if, however, the high speed brush energized one of the commutator segments designated fifty through ninety-nine, then brush 40A is energized. Referring to Figs. 7 and 8, a signal is passed through the buffer 150, through the delay line 118, and through the buffer 120 only when the high speed brush energizes a commutator segment designated fifty or greater. This signal activates the reshaper 122 to generate a positive potential signal at the terminal 126 and a zero potential signal at the terminal 124 to inhibit the gate 86 and to enable the gate 80. Thus, if the high speed brush energizes one of the first fifty commutator segments, brush 40B of the medium speed set of brushes is next pulsed; however, if the high speed brush energizes one of the last fifty commutator segments, then brush 40A of the medium speed set of brushes is next pulsed.

The same procedure utilized between the set of high speed brushes and the set of medium speed brushes, to energize the appropriate medium speed brush, is also utilized between the set of medium speed brushes and the set of low speed brushes to energize the appropriate low speed brush.

The system of using one coordinate brush as the reference for its next lower speed brush results in a device which permits high backlash tolerances with no ambiguities. Ambiguities, such as those caused by a brush straddling two commutator segments or a brush making contact only with the insulated area between segments, and the usual effects of backlash in the various gear trains are avoided in this invention.

This is accomplished by utilizing a split brush of two electrically isolated sections, such that the output of the previously sampled brush determines which section of the next speed brush is to be energized.

The commutator segments energized activate discrete rectifier units of the diode distributor to generate predetermined binary-coded decimal signals at the output terminals 244, 246, 248, 250, 252, 254, 256 and 258 of the diode distributor. These signals can be utilized as generated in serial-parallel form wherein the information representing the position of a particular brush appears in parallel form; however, the information as a unit is in series with the information from the other brushes; or the information can be fed into a memory device to transform the information into pure serial form.

Obviously many modifications and variations of the present invention are possible in the light of the above teachings. It is, therefore, to be understood that within the scope of the appended claims the invention may be practiced otherwise than as specifically described.

What is claimed is:

1. An analog-digital converter comprising an insulating member, a plurality of electrically disjoined conductive members supported by said insulating member, a pair of first and second brushes fixed relative to each other to scan said conductive members, a source of signals coupled to feed a signal through said first brush to a conductive member at a predetermined instant, a diode distributor network coupled to said conductive members to receive and convert the signal fed to a conductive member into code form to identify the conductive member energized, and brush selector means fed by said diode distributor network intrposed between said set of brushes and said source of signals to switch the output of said source of signals from said first brush to said second brush when the signal fed to said first brush is not passed to a conductive member.

2. An analog-digital converter comprising an insulating member, a plurality of electrically disjoined conductive members supported by said insulating member, a pair of first and second brushes fixed relative to each other to scan said conductive members, a source of signals coupled to feed a signal through said first brush to one of said conductive members at a predetermined instant, a diode distributor network coupled to said conductive members to receive and convert the signal fed to the conductive member into code form to identify the conductive member energized, brush selector means fed by said diode distributor network interposed between said set of brushes and said source of signals to switch the output of said source of signals from said first brush to said second brush when the signal fed to said first brush is not passed to a conductive member, and delay means fed by said diode distributor network to transpose the output signal from parallel to serial form.

3. An analog-digital converter comprising an insulating member, a plurality of electrically disjoined conductive member supported by said insulating member, a first pair of first and second brushes fixed relative to each other to scan said conductive members, a second pair of first and second brushes fixed relative to each other to scan said conductive members, driving means to drive said first and second pairs of brushes, a source of signals coupled initially to feed a pulse signal to the first brush of said first and second pairs of brushes, a diode distributor network coupled to said conductive members to receive and convert the signal fed to a conductive member into code form to identify the conductive member energized, first brush selector means fed by said diode distributor network and interposed between said source of signals and said first set of brushes to switch the output of said source of signals from said first brush to said second brush of said first pair of brushes only when the signal fed to said first brush is not passed to a conductive member, and second brush selector means fed by said diode distributor network and interposed between said source of signals and said second set of brushes to switch the output of said source of signals from said first brush to said second brush of said second pair of brushes only when the signal fed through said first pair of brushes is fed to a preselected group of disjoined conductive members.

4. An analog-digital converter comprising an insulating member, a plurality of electrically disjoined conductive members supported by said insulating member, a first pair of first and second brushes having electrically isolated sections fixed relative to each other to scan said conductive members, driving means coupled to drive said first pair of brushes, a second pair of first and second brushes having electrically isolated sections fixed relative to each other to scan said conductive member driven by said first pair of brushes, a source of signals coupled initially to feed a pulse signal to the first brush of said first and second pairs of brushes, first means coupled to said source of signals and to said first pair of brushes to switch the output of said source of signals from said first brush to said second brush of said first pair of brushes only when the signal fed to said first brush is not passed to a conductive member, and second means coupled to said second set of brushes to switch the output of said source of signals from said first brush to said second brush of said second pair of brushes only when the signal fed through either brush of said first pair of brushes is fed to one of a preselected group of consecutive disjoined conductive members.

5. An analog-digital converter comprising an insulating member, a plurality of electrically disjoined conductive members supported by said insulating member, a pair of first and second brushes fixed relative to each other to scan said conductive members, a source of signals coupled to feed a pulse signal selectively through said first brush to a conductive member at a predetermined instant, first means coupled to said conductive members to receive and convert the signal fed to a conductive member into code form to identify the conductive member energized, and brush selector means fed by said first means and interposed between said set of brushes and said source of signals to switch the output of said source of signals from said first brush to said second brush only when the signal fed to said first brush is not passed to a conductive member.

6. An analog-digital converter comprising an insulating member, a plurality of electrically disjoined conductive members supported by said insulating member, a pair of first and second brushes fixed relative to each other to scan said conductive members, a source of signals coupled to feed a pulse signal selectively through said first brush to a conductive member at a predetermined instant, a diode distributor network coupled to said conductive members to receive and convert the signal fed to a conductive member into code form to identify the conductive member energized, a first gate interposed between said source of signals and said first brush, a second gate interposed between said source of signals and said second brush, and control means interposed between said diode distributor and said first and second gates to switch the output signal of said source of signals from said first brush to said second brush only when the signal fed to said first brush is not passed to a conductive member.

7. An analog-digital converter comprising an insulating member, a plurality of electrically disjoined conductive members supported by said insulating member, a first pair of first and second brushes having electrically isolated sections fixed relative to each other to scan said conductive members, driving means coupled to drive said first pair of brushes, a second pair of first and second brushes having electrically isolated sections fixed relative to each other to scan said conductive member driven by said first rotatable split brush, a source of signals coupled initially to feed a pulse signal to the first brush of each of said first and second pairs of brushes, delay means interposed between said first and second pairs of brushes and said source of signals to provide sequential energization of said first and second pairs of brushes, first means coupled to said source of signals and to said first pair of brushes to switch the output of said source of signals from said first brush to said second brush of said first pair of brushes only when the signal fed to said first brush is not passed to a conductive member, and a second means coupled to said second set of brushes to switch the output signal of said source of signals from said first brush to said second brush of said second pair of brushes only when the signal fed through said first pair of brushes is fed to one of a preselected group of consecutive electrically disjoined conductive members.

References Cited in the file of this patent

UNITED STATES PATENTS

| | | |
|---|---|---|
| 2,630,562 | Johnson | Mar. 3, 1953 |
| 2,750,584 | Goldfischer | June 12, 1956 |
| 2,779,539 | Darlington | Jan. 29, 1957 |
| 2,792,174 | Rutter | May 14, 1957 |
| 2,860,326 | Walton | Nov. 11, 1958 |

OTHER REFERENCES

"Librascope Analog-Digital Converter," December 23, 1955, 6 pages.

Sullivan et al.: "A Commutating Device for Transforming Shaft Position into Binary Digit Information, November 1953, AFCRC Technical Report 53–41, 9 pages.